Patented Sept. 19, 1939

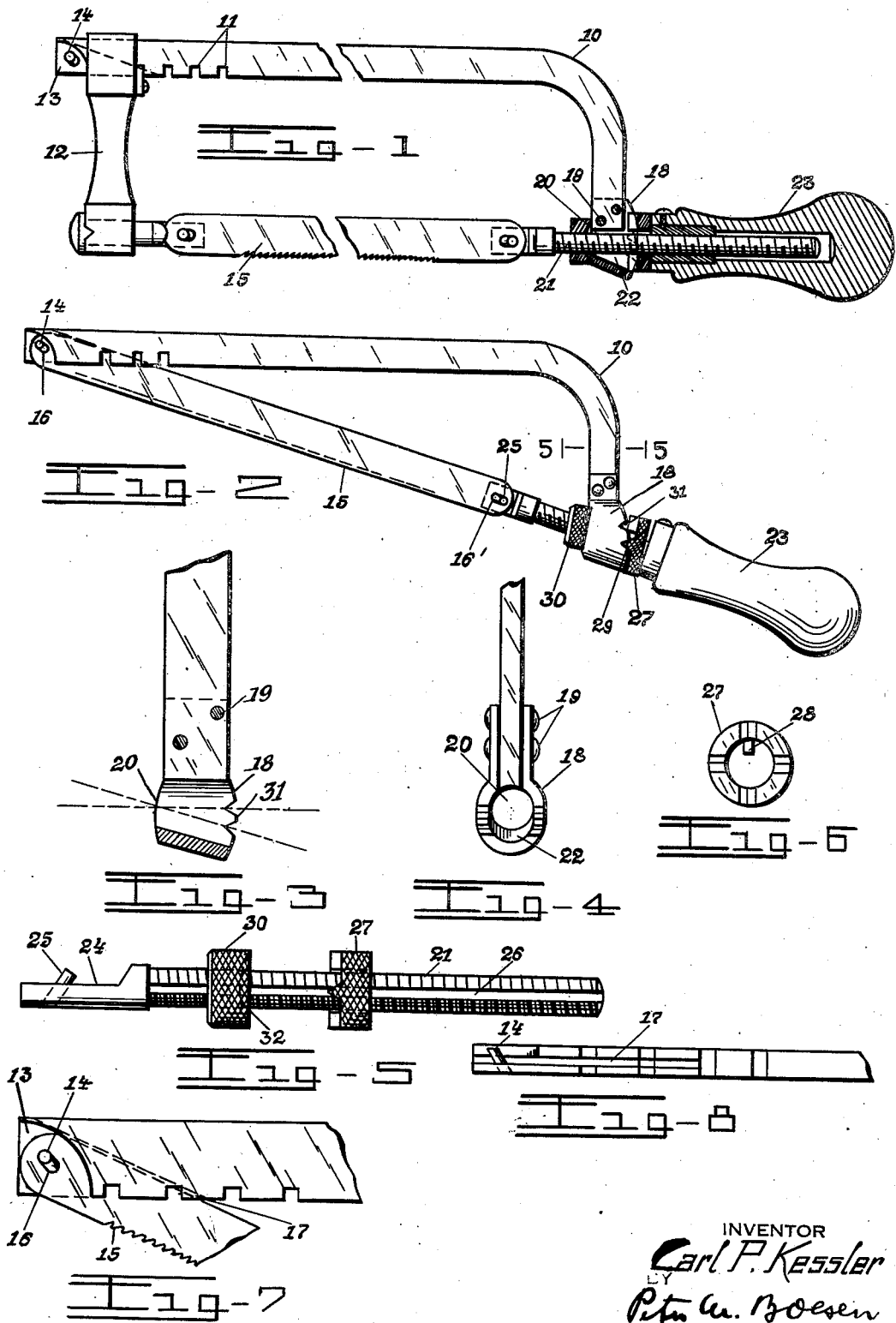

2,173,365

UNITED STATES PATENT OFFICE 2,173,365

HACKSAW

Carl P. Kessler, Bronx, N. Y.

Application February 9, 1938, Serial No. 189,480

4 Claims. (Cl. 145—34)

This invention relates to new and useful improvements in hacksaws, and it has for its object to provide a device which, without embodying any more parts than are used in the ordinary hacksaws, will permit the adjustment of the saw blades to different positions, at the same time providing hacksaws of different forms to be used according to the conditions at hand.

As my device is comparatively simple, the cost of manufacturing the same should be proportionately low.

With the above and other objects in view, this invention consists of the novel features of construction, combination and arrangement of parts, hereinafter fully described, claimed and illustrated in the accompanying drawing, forming part of this application, and in which similar characters of reference indicate corresponding parts in all views, and in which:—

Fig. 1 is a side elevational view of my device, partly in section, and with parts broken away.

Figure 2 is a side elevational view of a modification of my said device.

Figure 3 is a slightly enlarged side elevational detail view, showing a journal box.

Figure 4 is an elevational rear view of Figure 3.

Figure 5 is a side elevational detail view showing part of the handle rod, or stub-shaft of my device, with a nut and a serrated collar thereon.

Figure 6 is an end elevational view of the serrated collar, shown in Figure 5.

Figure 7 is a side elevational view of the end of a saw frame; while

Figure 8 is an elevational bottom view of Figure 7.

Referring more particularly to the drawing, 10 indicates a saw frame, which latter is provided with recesses 11 therein for the purpose of permitting the attachment to said frame, of an auxiliary member, as shown, for instance, at 12, and which forms part of the more or less ordinary and known construction.

The end portion of the frame 10, shown in Figure 2, is provided with a cut-away portion 13, as may especially be seen in Figure 7, and said frame has at the bottom of said cut-away portion integrally arranged thereon a bolt 14 adapted to receive the end of a saw blade 15, by means of an eyelet 16 in the latter, as shown in said Figure 2. In order, however, to secure a snug fitting of said saw blade 15 to the frame 10, the end portion of the latter is formed with a central groove 17 therein, as may be seen especially in Figure 8, and in dotted lines in Figure 7. The end portion of the saw blade will rest in said groove.

To the opposite end of the saw frame is connected a bearing piece, or journal-box 18, which is secured to said frame by means of bolts 19. Said journal-box is formed with an opening 20 adapted to receive the handle rod 21 therein. It will, however, be noted that said opening 20 is gradually enlarged towards its outer end, as it slants downward in said journal-box, thus leaving a space 22, whereby to give the handle rod a certain amount of free play, that is to permit the tilting of the handle rod in adjusting the saw frame structure to receive a certain saw blade.

The handle rod 21 is threaded into the handle 23 proper, as shown in Figure 1; said handle rod is at its front formed with a cut-away portion, as shown at 24 in Figure 5, and has at the bottom of said cut-away portion a bolt 25 integral therewith and adapted to receive the other end of the saw blade by means of an eyelet 16' in the latter, as shown especially in Figure 2.

The handle rod 21 is provided with a groove 26 therein, as shown in Figure 5. A serrated collar 27 is mounted on the handle rod, upon the outer side of the journal-box and between the latter and the handle 23; said collar has a stud 28, as shown in Figure 6, integral therewith and adapted to slide in the groove 26 of the handle rod in order to manipulate or turn said handle rod to the desired angle. The collar 27 is formed with a serrated surface 29 upon its side facing the journal-box 18, which latter, in turn, is correspondingly serrated, as shown at 31, in order to attain a relative adjustment of said collar and journal-box, as shown in Figure 2.

Upon the inner side of the journal-box is arranged a nut 30, which is threaded upon the handle rod and slightly curved upon one side thereof, as shown at 32 in Figure 5; said nut is adapted to form a close fitting joint with the handle rod and the journal-box, as shown in Figure 2, at time the saw blade is adjusted into workable position.

It is obvious that changes may be made in the form, construction and arrangement of the several parts, as shown, within the scope of the appended claims, without departing from the spirit of the invention, and I do not, therefore, wish to limit myself to the exact construction and arrangement shown and described herein.

What I claim as new, and desire to secure by Letters Patent of the United States, is:

1. A hack saw comprising a frame, means mounted upon the front end of the frame, whereby to attach a saw blade to said end of the frame at a selected one of a number of points, a bearing rigidly secured upon the rear end of the frame, said bearing having formed therein an opening increasing in width in a rearward direction, a screw-threaded handle rod formed with a recess therein and being mounted in said opening, means arranged at the front of said handle rod and adapted to engage the other end of the saw blade, said bearing being formed with a serrated surface upon its end facing the handle, a collar made with a serrated surface and mounted upon the handle rod, said serrated surface of the collar being adapted to cooperate with the serrated surface of the bearing, a stud integral with said collar and adapted to engage the recess in the handle rod, and a nut threaded upon said handle rod, whereby to secure the serrated collar and bearing in an angular position with respect to the handle rod.

2. In a device, as claimed in claim 1, and wherein the nut is formed with a slight curvature upon the inner side thereof and adapted to engage a corresponding curvature on the face of the bearing toward the V-shaped frame, whereby to permit said nut to assume different angular positions with respect to said bearing in securing the latter to the collar and handle rod.

3. A hack saw comprising a one piece frame, means arranged upon the front end of said frame, whereby one end of a saw blade may be attached to said frame at varied angles, a journal-box secured to the rear end of the latter, a handle rod mounted in said journal-box and being formed with a groove therein, and a saw blade attached to the frame and to said handle rod, the journal-box being made with an opening therein gradually increasing in width in a rearward direction and adapted to permit the adjustment of said handle rod to different angles with respect to the frame, and a collar having a stud integral therewith and made to engage the groove in said handle rod, whereby to permit the adjustment of the latter, the end portions of the collar and journal-box facing each other being formed with serrated portions, substantially as and for the purpose set forth.

4. A hack saw adapted to accommodate a saw blade and comprising a one piece frame, a plurality of blade-attaching means arranged upon the front of said frame, a journal-box secured to the rear end of the frame, said journal-box having therein an opening gradually increasing in width in a rearward direction, a handle rod disposed in said opening and being adjustable to different angles in said rearwardly enlarged opening in the journal-box, according to the angles at which the saw blade is held, and a collar securing said handle rod in a selected angular position, relative to said journal-box, whereby the said saw blade may be tensed at different angles on the frame, said handle rod being at its front formed with a cut-away portion and adapted to receive the other end of a saw blade thereon.

CARL P. KESSLER.